United States Patent Office 3,341,585
Patented Sept. 12, 1967

3,341,585
SUBSTITUTED 7- AND/OR 9-AMINO-6-DEOXYTETRACYCLINES
Panayota Bitha, New York, Joseph John Hlavka, Tuxedo, and Michael Joseph Martell, Jr., Pearl River, N.Y., assignors to American Cyanamid Company, Stamford, Conn., a corporation of Maine
No Drawing. Filed Dec. 1, 1966, Ser. No. 598,158
10 Claims. (Cl. 260—559)

ABSTRACT OF THE DISCLOSURE

This disclosure describes compounds of the class of 7- and/or 9-mono(lower alkyl)amino- or -di(lower alkyl)amino-6-deoxytetracyclines useful as antibacterial agents.

---

This application is a continuation-in-part of our copending application Ser. No. 548,070, filed May 6, 1966, now abandoned.

This invention relates to new compounds of the tetracycline family and, more particularly, is concerned with novel substituted 7- and/or 9-amino-6-deoxytetracyclines which may be represented by the following general formula:

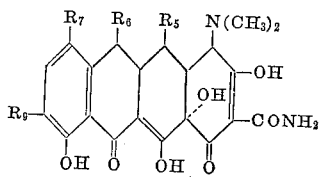

wherein $R_5$ is hydrogen, α-hydroxy or β-hydroxy, $R_6$ is α-methyl or β-methyl, and $R_7$ and $R_9$ are each hydrogen, mono(lower alkyl)amino or di(lower alkyl)amino with the proviso that $R_7$ and $R_9$ cannot both be hydrogen, and with the further proviso that when $R_5$ is hydrogen then $R_6$ is α-methyl. A preferred embodiment of the present invention may be represented by the general formula set forth above wherein $R_5$ is α-hydroxy or β-hydroxy, $R_6$ is α-methyl or β-methyl, $R_7$ is di(lower alkyl)amino and $R_9$ is hydrogen. Typical compounds represented by the above general formula are, for example, 7-dimethylamino-α-6-deoxytetracycline,
7-isopropylamino-α-6-deoxytetracycline,
9-methylamino-α-6-deoxytetracycline,
9-n-butylamino-α-6-deoxytetracycline,
7,9-di(diethylamino)-α-6-deoxytetracycline,
7-dimethylamino-5-α-hydroxy-α-6-deoxytetracycline,
7-isopropylamino-5-α-hydroxy-α-6-deoxytetracycline,
9-methylamino-5-α-hydroxy-α-6-deoxytetracycline,
9-methylamino-5-α-hydroxy-β-6-deoxytetracycline,
7-dimethylamino-5-α-hydroxy-β-6-deoxytetracycline,
9-methylamino-5-α-hydroxy-β-6-deoxytetracycline,
7-dimethylamino-5-β-hydroxy-α-6-deoxytetracycline,
7-n-butylamino-5-β-hydroxy-α-6-deoxytetracycline,
9-methylamino-5-β-hydroxy-α-6-deoxytetracycline,
9-methylamino-5-β-hydroxy-β-6-deoxytetracycline,
7,9-di(methylethylamino)-5-β-hydroxy-β-6-deoxytetracycline, and
9-ethylamino-5-β-hydroxy-β-6-deoxytetracycline.

The terms α-6-deoxy and β-6-deoxy have been used in the chemical literature and refer to the configuration of the methyl group in the 6-position. Thus, α-6-deoxy means that the methyl group in the 6-position is in the α-configuration.

These new tetracycline derivatives may be prepared by a reductive alkylation process comprising interacting a compound of the following general formula:

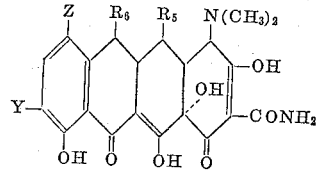

wherein $R_5$ and $R_6$ are as hereinabove defined and Y and Z are hydrogen, amino, a substituent reducible to amino, mono(lower alkyl)amino or a substituent reducible to mono(lower alkyl)amino with the proviso that Y and Z cannot both be hydrogen; with a carbonyl compound of the general formula:

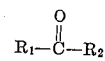

wherein $R_1$ is hydrogen or lower alkyl and $R_2$ is hydrogen or lower alkyl; in the presence of a reducing agent.

It is to be understood that when the term "lower alkyl" is used throughout this specification, it is meant to include all lower alkyl groups having up to about 6 carbon atoms. Accordingly, aldehydes and ketones useful in carrying out this reductive alkylation include, for example, formaldehyde, acetaldehyde, propionaldehyde, n-butyraldehyde, isobutyraldehyde, acetone, methyl ethyl ketone, diethyl ketone, etc.

In the second general formula set forth above, the substituents Y and Z are defined as hydrogen, amino, a substituent reducible to amino, mono(lower alkyl)amino or a substituent reducible to mono(lower alkyl)amino with the proviso that Y and Z cannot both be hydrogen. Suitable substituents reducible to amino may be, for example, nitro, nitroso, benzeneazo, substituted-benzeneazo, etc. Suitable substituted-benzeneazo groups may be, for example, p-sulfophenylazo, p-nitrophenylazo, 2,4-dinitrophenylazo, etc. Where $R_7$ and/or $R_9$ in the first general formula set forth above are disubstituted amino groups, such products may be prepared in either of two ways. In the first situation, Y and/or Z may be amino or a substituent reducible to amino and reductive dialkylation on an unsubstituted amino group occurs, whereby a disubstituted amino group is obtained. In the second situation, Y and/or Z may be mono(lower alkyl)amino or a substituent reducible to mono(lower alkyl)amino and reductive monoalkylation on a monoalkyl-substituted amino group occurs, whereby a disubstituted amino group is obtained. Suitable mono(lower alkyl)amino groups may be, for example, methylamino, ethylamino, n-propylamino, iso-propylamino, n-butylamino, iso-butylamino, t-butylamino, etc. Suitable substituents reducible to mono(lower alkyl)amino may be, for example, formylamino, acetylamino, N-(lower alkyl)hydroxylamino, and the like. Specific starting materials operable in this process include, 7-nitro-α-6-deoxytetracycline,
7-amino-α-6-deoxytetracycline,
7-nitroso-α-6-deoxytetracycline,
9-nitro-α-6-deoxytetracycline,
9-amino-α-6-deoxytetracycline,
9-phenylazo-α-6-deoxytetracycline,
7-nitro-5-α-hydroxy-α-6-deoxytetracycline,
7-amino-5-α-hydroxy-β-6-deoxytetracycline,
7-p-sulfophenylazo-5-α-hydroxy-α-6-deoxytetracycline,
9-amino-5-α-hydroxy-β-6-deoxytetracycline,
9-nitroso-5-α-hydroxy-α-6-deoxytetracycline,
9-phenylazo-5-α-hydroxy-β-6-deoxytetracycline,
7-nitro-5-β-hydroxy-α-6-deoxytetracycline,
7-amino-5-β-hydroxy-β-6-deoxytetracycline,
7-nitroso-5-β-hydroxy-α-6-deoxytetracycline, 7-p-nitrophenylazo-5-β-hydroxy-β-6-deoxytetracycline,
9-nitro-5-β-hydroxy-α-6-deoxytetracycline,
7,9-dinitro-α-6-deoxytetracycline,
7,9-diamino-5-α-hydroxy-α-6-deoxytetracycline, and
7,9-di(phenylazo)-5-β-hydroxy-β-6-deoxytetracycline.

The 7- and/or 9-nitro-6-deoxytetracycline starting materials for this process may be prepared by nitrating an appropriate 6-deoxytetracycline with nitronium tetrafluoroborate or other suitable nitronium salt in an inert solvent such as nitromethane or chloroform at a temperature of from about −10° C. to about 60° C. for a period of time of from about several minutes to about several hours or more. If the mononitro derivative is desired then one molar equivalent of nitronium tetrafluoroborate is employed, whereas if a dinitro derivative is desired then two molar equivalents of nitronium tetrafluoroborate are employed. The 7- and/or 9-nitroso-6-deoxytetracycline starting materials may be readily prepared by treating an appropriate 6-deoxytetracycline with nitrous acid in acidic aqueous medium. The 7- and/or 9-benzeneazo- or substituted-benzeneazo - 6 - deoxytetracycline starting materials may be readily prepared by coupling an appropriate 6-deoxytetracycline with benzene diazonium halide or a substituted benzene diazonium halide under conditions well known in the art.

The 7- and/or 9-amino-6-deoxytetracycline starting materials for this process may be prepared by the catalytic reduction of the corresponding 7- and/or 9-nitro, nitroso, phenylazo or substituted-phenylazo-6-deoxytetracyclines. The 7- and/or 9-amino-6-deoxytetracycline starting materials may also be prepared by the catalytic reduction of the corresponding 11a-chloro-7- and/or 9-nitro, nitroso, phenylazo or substituted-phenylazo-6-deoxytetracyclines. In this catalytic reduction, the 11a-chloro group is concurrently removed while the 7- and/or 9-substituent is reduced to amino. These 11a-chloro-7- and/or 9-substituted-6-deoxytetracycline intermediates may also be employed directly in the reductive alkylation step whereupon the 11a-chloro group is concurrently removed. The 11a-chloro-7- and/or 9-nitro, nitroso, phenylazo or substituted-phenylazo-6-deoxytetracycline intermediates may be readily prepared by nitrating, nitrosating, or coupling with benzene diazonium halide or a substituted benzene diazonium halide, an appropriate 11a-chloro-6-deoxytetracycline under the same general conditions as are employed with the 11a-unblocked compounds.

The reductive alkylation process may be accomplished by either chemical or catalytic reduction using procedures well-known to those in the art. Catalytic reduction, which is especially suited for the reductive alkylation of the tetracycline starting compounds set forth above, may be accomplished in a solvent for the tetracycline starting compound in the presence of a carbonyl compound and a metal catalyst and hydrogen gas at pressures from atmospheric to super-atmospheric. Ordinarily, the reductive alkylation is conveniently carried out at hydrogen pressures of from about one to about four atmospheres. Temperature does not appear to be critical in the catalytic hydrogenation. Temperatures of from 0° C. to 50° C., and usually room temperature, are preferred since they generally give best results. The metal catalyst may be of the base metal type, such as nickel or copper chromite, or it may be of the noble metal type, such as finely divided platinum, palladium or rhodium. The noble metal catalysts are advantageously employed on a carrier such as finely divided alumina, activated charcoal, diatomaceous earth, etc., in which form they are commonly available. The hydrogenation is carried out until the desired amount of hydrogen gas is absorbed at which point the hydrogenation is stopped. The solvents selected for the catalytic reduction should be reaction-inert, that is, they should not be capable of reacting with the starting materials, products, or hydrogen under the conditions of the reaction. A variety of solvents may be used for this purpose and minimum laboratory experimentation will permit the selection of a suitable solvent for any specific tetracycline starting compound. Generally, the catalytic reductive alkylation may be carried out in solvents such as water; lower alkanols, e.g. methanol, ethanol; lower alkoxy lower alkanols, e.g. 2-methoxyethanol, 2-ethoxyethanol; tetrahydrofuran; dioxane; dimethylformamide; etc.

A variety of chemical reducing agents may be used in the reductive alkylation process. These include reduction with active metals in mineral acids, e.g. zinc, tin, or iron in hydrochloric acid; reduction with metal couples such as the copper-zinc couple, the tin-mercury couple, aluminum amalgam or magnesium amalgam; reduction with lithium aluminum hydride or sodium borohydride; and reduction with formic acid. Of these, reduction with zinc and hydrochloric acid and reduction with formic acid are preferred. When aqueous systems are used in the aforementioned chemical reductive alkylations, it is at times desirable to utilize a water-miscible organic solvent, particularly when the tetracycline starting compound is of limited solubility in the reaction mixture. The water-miscible solvent does not alter the course of the reduction but merely provides for more efficient reduction, e.g. a shorter reaction time by providing more intimate contact of the reagents. A large number of such solvents are available for this purpose and include, among others, dimethylformamide, dimethoxyethane, methanol, ethanol, dioxane, tetrahydrofuran, and the like.

The novel products of the present invention are obtained from the reductive alkylation reaction mixtures by standard procedures. For example, the products may be isolated from the catalytic hydrogenation reaction mixtures, after filtration of the catalyst, by precipitation with a solvent such as ether or hexane or by concentration, usually under reduced pressure, or by a combination of these. Work-up of the chemical reductive alkylation reaction mixtures to obtain the desired products may also be accomplished by known procedures such as precipitation, concentration, solvent extraction, or combinations of these procedures. After isolation, the products may be purified by any of the generally known methods for purification of tetracycline compounds. These include recrystallization from various solvents and mixed solvent systems, chromatographic techniques, and counter current distribution, all of which are usually employed for this purpose.

The new tetracyclines of this invention are biologically active and have the broad-spectrum antibacterial activity of the previously known tetracyclines. The antibacterial spectrum of certain of these compounds, representing the amount required to inhibit the growth of various typical bacteria, was determined in a standard manner by the agar dilution streak plate technique which is commonly used in testing new antibiotics. The following table summarizes in the vitro activity of 7-dimethylamino-5-α-hydroxy-β - 6-deoxytetracycline (1) as compared with 7-amino - 5 - α - hydroxy-β-6-deoxytetracycline (2) against a variety of disease-causing microorganisms.

| Organism | Minimal inhibitory conc. (mcg./ml.) | |
|---|---|---|
| | (1) | (2) |
| Mycobacterium smegmatis ATCC 607 | 3.1 | 31 |
| Staphylococcus aureus ATCC 6538P | 12.5 | 250 |
| Staphylococcus aureus ATCC 13709 | 6.2 | 62 |
| Sarcina lutea ATCC 9341 | 6.2 | 62 |
| Streptococcus faecalis ATCC 8043 | 12.5 | 250 |
| Streptococcus pyogenes C-203 | 6.2 | 31 |
| Bacillus subtilis ATCC 6633 | 6.2 | 125 |
| Corynebacterium xerosis NRRL B-1397 | 6.2 | 31 |
| Bacillus cereus ATCC 10702 | 6.2 | 62 |
| Klebsiella pneumoniae ATCC 10031 | 62 | 250 |

The present new tetracycline compounds may be formulated into various compositions analogous to the parent tetracyclines from which they are derived. They are useful therapeutically in feeds or as growth stimulants, in veterinary practice and in agriculture.

For human therapy, the usual oral dosage of the present new compounds is from about 0.1 to about 2 g. per day for the average adult. The product is formulated into capsules or tablets containing from 25 to 250 mg. of antibiotic on an activity basis. Suspensions or solutions in various vehicles are prepared using concentrations ranging from 5 to 125 mg./ml. For parenteral administration intramuscularly or intravenously, the daily dose is reduced to about .05 to 1.0 g. Intramuscular formulations comprise solutions of the antibiotic at concentrations ranging from 50 to 100 mg./ml. Intravenous administration is by means of isotonic solutions having antibiotic concentration of about 10 mg./ml. Both types of parenteral products are conveniently distributed as solid compositions for reconstitution. These products may also be used for topical application in the usual extending media. In all instances, of course, the attending physician will indicate the dosage to fit the needs of a particular patient.

The new tetracyclines of this invention are amphoteric compounds and hence acid-addition salts, that is both mono- and di-salts, may be readily prepared. The preferred acids are the non-toxic pharmaceutically acceptable acids, e.g. the mineral acids such as hydrochloric, sulfuric, and the like although organic acids such as trichloroacetic may also be used. The acid-addition salts may be prepared by treating the new tetracyclines with approximately one or two equivalents of the chosen acid in a suitable solvent. These new tetracyclines also form typical Mannich derivatives with organic aldehydic compounds and nitrogen bases.

The invention will be described in greater detail in conjunction with the following specific examples.

EXAMPLE 1

*Preparation of 11a-chloro-α-6-deoxy-5-α-hydroxytetracycline*

To a solution of α-6-deoxy-5-α-hydroxytetracycline free base (1 mmole) in 1,2-dimethoxyethane (45 ml. freshly distilled from sodium hydride) is added N-chlorosuccinimide (1.05 equivalent). The mixture is stirred for 10 minutes at room temperature and added to heptane (500 ml.) The solid which precipitates is collected by filtration, washed well with heptane and dried.

EXAMPLE 2

*Preparation of 11a-chloro-7-p-sulfophenylazo-α-6-deoxy-5-α-hydroxytetracycline*

The 11a-chloro-α-6-deoxy-5α-hydroxytetracycline (1 mmole) is suspended in water (22 ml.). The suspension is cooled to 0°–5° C. in an ice bath. The pH is adjusted to 7.5 with 1 N sodium hydroxide and is then stirred at 0°–5° C. for 15 minutes. A solution of anhydrous sodium carbonate (0.55 mmole) in water (4 ml.) is prepared. The sulfanilic acid monohydrate (1.1 mmole) is added and the mixture is heated to get the acid into the carbonate solution. It is cooled to 0°–5° C. and then mixed with a solution of sodium nitrite (1.2 mmole) in water (1 ml.). This mixture is poured into a beaker containing 1.1 g. of cracked ice and 0.23 ml. (2.75 mmole) of concentrated hydrochloric acid. In a few minutes the white crystals of the diazonium salt precipitate out. The pH of the 11a-chloro-α-6-deoxy-5-α-hydroxytetracycline suspension is checked and readjusted to 7.5. Then the suspension of the diazonium salt is added slowly while the pH is kept at 7.5 with 1 N NaOH. The so-obtained red solution is stirred for one hour at 0°–5° C. The ice bath is then removed and the solution is acidified to pH 1.5 with concentrated HCl. The solid is centrifuged, transferred into a funnel, washed with water and dried.

EXAMPLE 3

*Preparation of 7-amino-α-6-deoxy-5-α-hydroxytetracycline*

The solution of the 7-azo-derivative of Example 2 (0.3 mmole) in ethylene glycol monomethyl ether (20 ml.) is prepared. There is added 2 N sulfuric acid (1 ml.) and the palladium-on-carbon (10%) catalyst (100 mg.). The mixture is reduced under atmospheric pressure and room temperature for one hour. Catalyst is then filtered and the filtrate is evaporated to dryness.

EXAMPLE 4

*Preparation of 7-dimethylamino-α-6-deoxy-5-α-hydroxytetracycline*

The procedure of Example 3 is repeated. The filtrate is mixed with 40% formaldehyde (1.6 ml.) and 10% palladium-on-carbon catalyst (100 mg.). The reduction is continued for one additional hour. The catalyst is removed by filtration and the filtrate concentrated to about 5 ml. It is diluted with ether and the precipitated product is isolated by filtration and dried.

EXAMPLE 5

*Preparation of 7-p-nitrophenylazo-α-6-deoxy-5-α-hydroxytetracycline*

The p-nitrobenzenediazonium fluoroborate salt (1.82 mmole) is suspended in water (23 ml.) and cooled to 0°–5° C. in an ice bath. The 11a-chloro-α-6-deoxy-5-α-hydroxytetracycline (1.64 mmole) is also suspended in water (40 ml.). The suspension is cooled to 0°–5° C. and the pH adjusted to 7.5 with 6 N sodium hydroxide. The diazonium salt is added while the pH is kept at 7.5 with the sodium hydroxide. After all the diazonium salt is added, the pH of the mixture is adjusted to 8.5 and the red solution stirred at 0°–5° C. for about 10 minutes. It is then acidified to pH 1.8 with concentrated hydrochloric acid and the red-brown precipitate is centrifuged and dried.

EXAMPLE 6

*Preparation of 11a-chloro-β-6-deoxy-5-α-hydroxytetracycline*

To a solution of β-6-deoxy-5-α-hydroxytetracycline free base (1 mmole) in 1,2-dimethoxyethane (65 ml. freshly distilled from sodium hydride) is added N-chlorosuccinimide (1 mmole). The mixture is stirred for 5 minutes at room temperature and added to heptane (100 ml.). The solid which precipitates is collected by filtration, washed well with heptane and dried.

EXAMPLE 7

*Preparation of 11a-chloro-7-p-nitrophenylazo-β-6-deoxy-5-α-hydroxytetracycline*

The p-nitrobenzenediazonium fluoroborate salt (0.7 mmole) is suspended in water (5 ml.) and cooled to 0°–5° C. in an ice bath. The 11a-chloro-β-6-deoxy-5-α-hydroxytetracycline (0.626 mmole) is also suspended in water (20 ml.). The suspension is cooled to 0°–5° C. and the pH adjusted to 7.0 with 1 N NaOH. The diazonium salt is added while the pH is kept at 7.0 with the sodium hydroxide. After all the diazonium salt is added, the pH of the mixture is adjusted to 8.0 and stirred at 0°–5° C. for about 10 minutes. It is then acidified to pH 2.0 with conc. HCl and the red-brown precipitate is centrifuged and dried.

EXAMPLE 8

*Preparation of 7-amino-β-6-deoxy-5-α-hydroxytetracycline*

The solution of 11a-chloro-7-p-nitrophenylazo-β-6-deoxy-5-α-hydroxytetracycline (270 mg.) in ethylene glycol monomethyl ether (10 ml.) is prepared. There is added conc. $H_2SO_4$ (0.15 ml.) and the palladium-on-carbon (10%) catalyst (130 mg.). The mixture is reduced under atmospheric pressure and room temperature for one hour.

EXAMPLE 9

Preparation of 7-dimethylamino-β-6-deoxy-5-α-hydroxytetracycline

The 7-amino-β-6-deoxy-5-α-hydroxytetracycline (70 mg.) is dissolved in ethylene glycol monomethyl ether (10 ml.). Then is added the conc. $H_2SO_4$ (0.05 ml.), the solution of formaldehyde in water (40%; 0.4 ml.) and the palladium-on-carbon (10%) catalyst (40 mg.). The mixture is reduced under atmospheric pressure and room temperature for one and a half hours. The catalyst is then filtered, the filtrate is evaporated to dryness, and the product is purified by partition column chromatography.

EXAMPLE 10

Preparation of 7- and/or 9-nitro-β-6-deoxy-5-α-hydroxytetracycline

A solution of β-6-deoxy-5-α-hydroxytetracycline (444.4 mg.; 1 mmole) and potassium nitrate (111 mg.; 1.1 mmole) in liquid HF (10 ml.) is prepared and stirred in an ice bath for one hour. The solvent is then stripped off by passing a stream of nitrogen through. The residue is received in acetone (5 ml.) and the product is precipitated out with ether, filtered and dried. The two isomers are separated by partition chromatography.

EXAMPLE 11

Preparation of 7- and/or 9-nitro-α-6-deoxy-5-α-hydroxytetracycline

This product is prepared according to the procedure of Example 10 using the α-6-deoxy-5-α-hydroxytetracycline instead of the β-6-deoxy isomer.

EXAMPLE 12

Preparation of 7- and/or 9-amino-β-6-deoxy-5-α-hydroxytetracycline

The crude product of Example 10 (200 mg.) is dissolved in a mixture of ethylene glycol monomethyl ether (15 ml.) and conc. hydrochloric acid (0.13 ml.). The palladium-on-carbon (10%) catalyst (100 mg.) is added and the mixture is reduced under atmospheric pressure and room temperature for one hour. The catalyst is then filtered and the filtrate evaporated to dryness. The two isomers are separated by partition chromatography.

EXAMPLE 13

Preparation of 7- and/or 9-amino-α-6-deoxy-5-α-hydroxytetracycline

This product is prepared according to the procedure of Example 12 using the crude product of Example 11.

EXAMPLE 14

Preparation of 7- and/or 9-dimethylamino-β-6-deoxy-5-α-hydroxytetracycline

The crude product of Example 12 (150 mg.) is dissolved in ethylene glycol monomethyl ether (10 ml.). There is added a 40% solution of formaldehyde (1.2 ml.), conc. hydrochloric acid (0.1 ml.) and palladium-on-carbon (10%) catalyst (100 mg.). The mixture is reduced under atmospheric pressure and room temperature for one hour. The catalyst is then filtered and the filtrate is concentrated to about 4 ml. of volume and the product precipitated out with ether. The two isomers are separated by partition column chromatography.

EXAMPLE 15

Preparation of 7- and/or 9-dimethylamino-α-6-deoxy-5-α-hydroxytetracycline

This product is prepared according to the procedure of Example 14 using the crude product of Example 13.

What is claimed is:

1. A compound selected from the group consisting of 6-deoxytetracyclines of the formula:

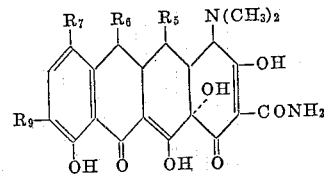

wherein $R_5$ is selected from the group consisting of hydrogen, α-hydroxy and β-hydroxy, $R_6$ is selected from the group consisting of α-methyl and β-methyl, and $R_7$ and $R_9$ are each selected from the group consisting of hydrogen, mono(lower alkyl)amino and di(lower alkyl)amino with the proviso that $R_7$ and $R_9$ cannot both be hydrogen, and with the further proviso that when $R_5$ is hydrogen then $R_6$ is α-methyl; and the non-toxic acid-addition salts thereof.

2. A compound according to claim 1 wherein $R_5$ is α-hydroxy, $R_6$ is α-methyl, $R_7$ is dimethylamino and $R_9$ is hydrogen.

3. A compound according to claim 1 wherein $R_5$ is α-hydroxy, $R_6$ is β-methyl, $R_7$ is dimethylamino and $R_9$ is hydrogen.

4. A compound according to claim 1 wherein $R_5$ is β-hydroxy, $R_6$ is α-methyl, $R_7$ is dimethylamino and $R_9$ hydrogen.

5. A compound according to claim 1 wherein $R_5$ is β-hydroxy, $R_6$ is β-methyl, $R_7$ is dimethylamino and $R_9$ is hydrogen.

6. A compound according to claim 1 wherein $R_5$ is α-hydroxy, $R_6$ is β-methyl, $R_7$ is hydrogen and $R_9$ is methylamino.

7. A compound according to claim 1 wherein $R_5$ is α-hydroxy, $R_6$ is α-methyl, $R_7$ is hydrogen and $R_9$ is methylamino.

8. A compound according to claim 1 wherein $R_5$ is α-hydroxy, $R_6$ is α-methyl, $R_7$ is diethylamino and $R_9$ is hydrogen.

9. A compound according to claim 1 wherein $R_5$ is hydrogen, $R_6$ is α-methyl, $R_7$ is dimethylamino and $R_9$ is hydrogen.

10. A compound according to claim 1 wherein $R_5$ is α-hydroxy, $R_6$ is β-methyl, $R_7$ is dimethylamino and $R_9$ is hydrogen; said compound being in the form of its hydrochloride salt.

References Cited

UNITED STATES PATENTS 3,165,551  11/1965  Blackwood et al. _____ 260—559

NICHOLAS S. RIZZO, *Primary Examiner.*